US012094401B2

(12) United States Patent
An et al.

(10) Patent No.: US 12,094,401 B2

(45) Date of Patent: Sep. 17, 2024

(54) PREDICTIVE DISPLAY DEVICE AND DRIVING METHOD THEREOF

(71) Applicant: SAMSUNG DISPLAY CO., LTD., Yongin-si (KR)

(72) Inventors: Byoung Kwan An, Yongin-si (KR); Seung Ho Park, Yongin-si (KR); Sang Myeon Han, Yongin-si (KR)

(73) Assignee: SAMSUNG DISPLAY CO., LTD, Yongin-si (KR)

( * ) Notice: Subject to any disclaimer, the term of this patent is extended or adjusted under 35 U.S.C. 154(b) by 0 days.

(21) Appl. No.: 18/495,192

(22) Filed: Oct. 26, 2023

(65) Prior Publication Data

US 2024/0221622 A1 Jul. 4, 2024

(30) Foreign Application Priority Data

Jan. 4, 2023 (KR) ........................ 10-2023-0001434

(51) Int. Cl.
*G09G 3/32* (2016.01)

(52) U.S. Cl.
CPC ....... *G09G 3/32* (2013.01); *G09G 2320/0276* (2013.01); *G09G 2320/041* (2013.01); *G09G 2330/021* (2013.01)

(58) Field of Classification Search
None
See application file for complete search history.

(56) References Cited

U.S. PATENT DOCUMENTS

| | | | | |
|---|---|---|---|---|
| 9,165,518 | B2 | 10/2015 | Choi et al. | |
| 9,384,696 | B2 | 7/2016 | Okuno et al. | |
| 11,302,269 | B2 | 4/2022 | Kim et al. | |
| 11,763,745 | B2 * | 9/2023 | Lim | G09G 3/3233 345/691 |
| 2022/0262307 | A1 * | 8/2022 | Pyun | G09G 5/06 |
| 2022/0406235 | A1 * | 12/2022 | Pyun | G09G 3/20 |
| 2023/0298502 | A1 * | 9/2023 | Lee | G09G 3/3233 |

FOREIGN PATENT DOCUMENTS

| | | |
|---|---|---|
| KR | 10-1954934 | 3/2019 |
| KR | 10-2215204 | 2/2021 |
| KR | 10-2021-0153172 | 12/2021 |
| KR | 10-2023-0074322 | 5/2023 |

* cited by examiner

*Primary Examiner* — Stephen T. Reed

(74) *Attorney, Agent, or Firm* — F. Chau & Associates, LLC

(57) ABSTRACT

A display device includes: pixels that receive data voltages corresponding to output grayscales; a sensing circuit that senses electrical states of the pixels to provide sensing information; and a grayscale converter that generates the output grayscales with respect to the pixels based on input grayscales and the sensing information, wherein the grayscale converter predicts a temperature of at least one of the pixels based on the sensing information, calculates a current control amount for the at least one of the pixels based on the predicted temperature and the input grayscales, and calculates the output grayscales for the at least one of the pixels based on the current control amount and the input grayscales.

20 Claims, 11 Drawing Sheets

<THRESHOLD VOLTAGE SENSING PERIOD>

<DIODE VOLTAGE SENSING PERIOD>

PREDICTIVE DISPLAY DEVICE AND DRIVING METHOD THEREOF

CROSS-REFERENCE TO RELATED APPLICATION

This application claims priority under 35 U.S.C. § 119 to and the benefit of Korean Patent Application No. 10-2023-0001434, filed in the Korean Intellectual Property Office on Jan. 4, 2023, the entire disclosure of which is incorporated by reference herein.

FIELD

The present disclosure relates to display devices and driving methods thereof, and more particularly relates to a predictive display device and driving method with pixel temperature prediction.

DISCUSSION

As information technology develops, a display device, which operates as a connection medium between a user and information, may fill an expanding role. Accordingly, the use of display devices, such as liquid crystal display devices, organic light-emitting display devices, and the like, may increase.

A display device displays an image by using a plurality of pixels. When a temperature of the display device is high, a drain-source current characteristic for a gate-source voltage of driving transistors for the pixels may vary. In this case, a current flowing through the driving transistors may increase more than that expected. The increased current may increase luminance of an image to deteriorate image quality. In addition, a vicious cycle in which the increased luminance again causes an increase in temperature may continue.

Therefore, it is desired to further control the current flowing through the display device, and depending on various design specifications or product types, a temperature sensor may be used to control such a current.

SUMMARY

An embodiment of the present disclosure may provide a display device and a driving method thereof that may control a current of a display device without including or using a temperature sensor.

A display device embodiment of the present disclosure may include pixels that receive data voltages corresponding to output grayscales; a sensing circuit that senses electrical states of the pixels to provide sensing information; and a grayscale converter that generates the output grayscales with respect to the pixels based on input grayscales and the sensing information, wherein the grayscale converter predicts a temperature of at least one of the pixels based on the sensing information, calculates a current control amount for the at least one of the pixels based on the predicted temperature and the input grayscales, and calculates the output grayscales for the at least one of the pixels based on the current control amount and the input grayscales.

A driving method embodiment of the present disclosure may include driving method for a display device, comprising: sensing electrical states of pixels to provide sensing information; generating output grayscales with respect to the pixels based on input grayscales and the sensing information; and supplying data voltages to the pixels corresponding to the output grayscales, wherein in the generating of the output grayscales, a temperature of the pixels is predicted based on the sensing information, a current control amount is calculated based on the predicted temperature and the input grayscales, and the output grayscales are calculated based on the current control amount and the input grayscales.

An embodiment of the present disclosure may provide a display device including: pixels that receive data voltages corresponding to output grayscales; a sensing circuit that senses the pixels to provide generated sensing information; a grayscale converter that generates the output grayscales based on the sensing information and input grayscales with respect to the pixels, wherein the grayscale converter predicts a temperature of the pixels based on the sensing information, calculates a current control amount based on the predicted temperature and the input grayscales, and calculates the output grayscales based on the current control amount and the input grayscales.

The sensing information may be a mobility of a driving transistor included in each of the pixels.

The grayscale converter may include a temperature predictor that predicts a temperature of the corresponding pixels greater as the mobility is greater.

The grayscale converter may include a current control amount calculator that calculates the current control amount greater as the predicted temperature is greater and as the input grayscales are greater.

The grayscale converter may include a grayscale calculator that calculates a difference between the input grayscales and the output grayscales greater as an absolute value of the current control amount is greater.

The grayscale calculator may calculate the output grayscales to be lesser than the input grayscales as the absolute value of the current control amount is greater when the current control amount has a positive value, and the grayscale calculator may calculate the output grayscales to be greater than the input grayscales as the absolute value of the current control amount is greater when the current control amount has a negative value.

The grayscale converter may further include a current control amount calculator that calculates the current control amount in units of blocks partitioning the pixels.

The current control amount calculator may further include a current change ratio calculator that calculates a current change ratio greater as the predicted temperature is greater, for each of the blocks.

The current control amount calculator may further include a load ratio calculator that calculates a load ratio, which is a ratio of the input grayscales of each block to the input grayscales of substantially all the pixels, for each of the blocks.

The current control amount calculator may further include a total current control amount calculator that calculates the current control amount by summing values obtained by multiplying the current change ratio and the load ratio, for each of the blocks.

An embodiment of the present disclosure may provide a driving method of a display device, including: sensing pixels to provide generated sensing information; generating output grayscales based on the sensing information and input grayscales with respect to the pixels; and supplying data voltages corresponding to the output grayscales to the pixels, wherein in the generating the output grayscales, a temperature of the pixels is predicted based on the sensing information, a current control amount is calculated based on the predicted temperature and the input grayscales, and the output grayscales is calculated based on the current control amount and the input grayscales.

The sensing information may be a mobility of a driving transistor included in each of the pixels.

In the generating the output grayscales, a temperature of the corresponding pixels may be predicted greater as the mobility is greater.

In the generating the output grayscales, the current control amount may be calculated greater as the predicted temperature is greater and as the input grayscales are greater.

In the generating of the output grayscales, a difference between the input grayscales and the output grayscales may be significantly calculated as an absolute value of the current control amount increases.

The output grayscales may be calculated to be lesser than the input grayscales as the absolute value of the current control amount is greater when the current control amount has a positive value, and the output grayscales may be calculated to be greater than the input grayscales as the absolute value of the current control amount is greater when the current control amount has a negative value.

In the generating the output grayscales, the current control amount may be calculated in units of blocks partitioning the pixels.

A current change ratio may be calculated greater as the predicted temperature is greater, for each of the blocks.

For each of the blocks, a load ratio that is a ratio of the input grayscales of each block to the input grayscales of substantially all the pixels may be calculated.

The current control amount may be calculated by summing values obtained by multiplying the current change ratio and the load ratio, for each of the blocks.

According to an embodiment of the display device and driving method thereof per the present disclosure, a current of a display device may be optimized or controlled without a temperature sensor.

DETAILED DESCRIPTION

Figure 1:
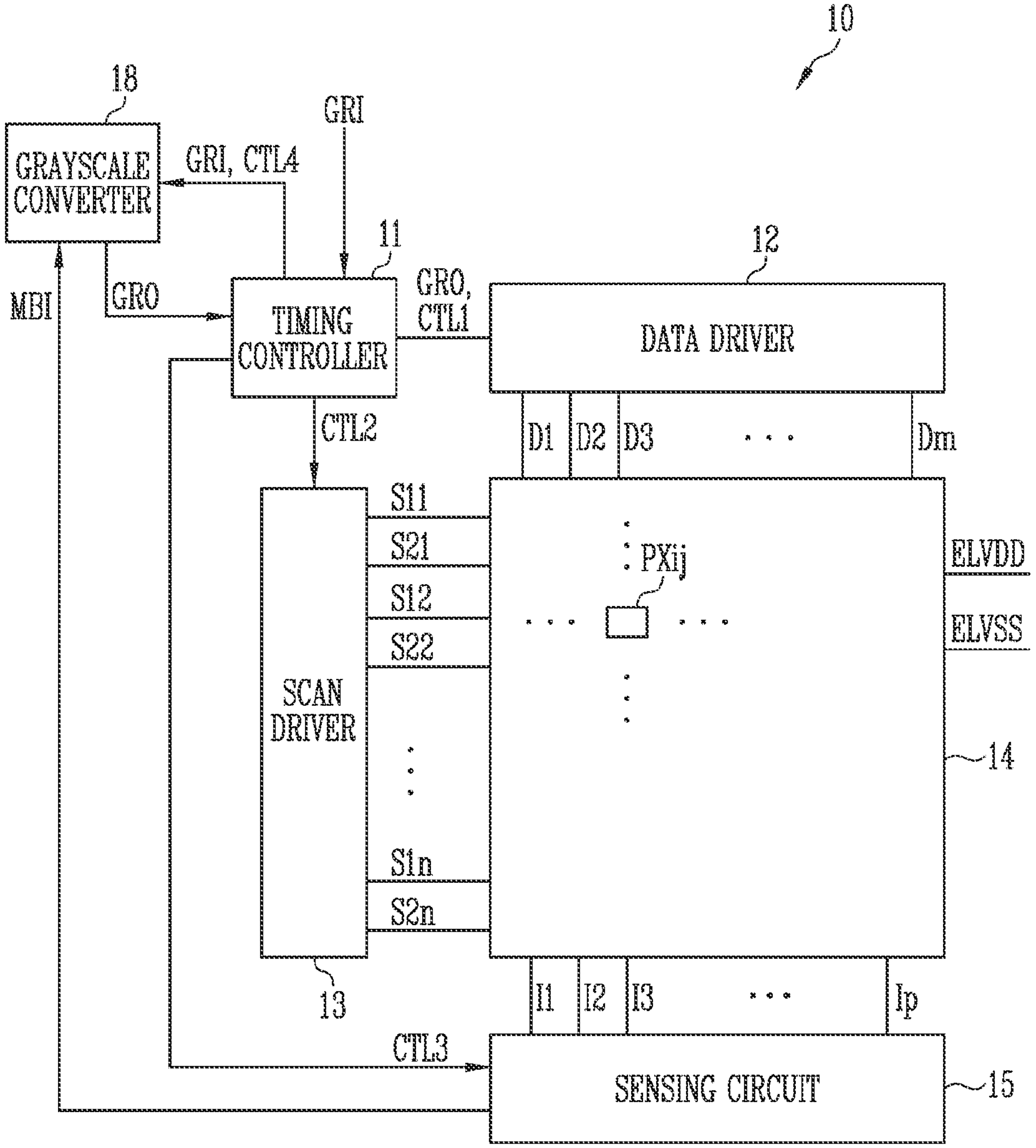
FIG. 1 is a block diagram for explaining a display device according to an embodiment of the present disclosure.

The present disclosure will be described more fully hereinafter by way of example with reference to the accompanying drawings, in which illustrative embodiments of the disclosure are shown. As those skilled in the art may appreciate, the illustrative embodiments described herein may be modified in various ways without departing from the spirit or scope of the present disclosure.

In order to clearly describe the present disclosure, parts or portions that are substantially repetitive or irrelevant to the description may be omitted, and substantially identical or similar constituent elements throughout the specification may be denoted by substantially the same or similar reference indicia. Therefore, such reference indicia may be used in multiple drawings without a full reintroduction for each.

Further, in the drawings, the size and thickness of each element may be arbitrarily illustrated for ease of description, and the present disclosure is not necessarily limited to those illustrated in the drawings. In the drawings, the thicknesses of layers, films, panels, regions, areas, or the like may be exaggerated for clarity.

FIG. 1 is referenced for explaining a display device according to an embodiment of the present disclosure.

Referring to FIG. 1, a display device 10 according to an embodiment of the present disclosure may include a timing controller 11, a data driver 12, a scan driver 13, a pixel array 14, a sensing circuit 15, and a grayscale converter 18.

The timing controller 11 may receive input grayscales GRI and control signals for each frame (e.g., an image frame) from a processor and provide the input grayscales GRI to the grayscale converter 18. Here, the processor may correspond to at least one of a graphics processing unit (GPU), a central processing unit (CPU), and/or an application processor (AP). The timing controller 11 may receive output grayscales GRO converted by the grayscale converter 18 from the received input grayscales GRI, and provide the output grayscales GRO to the data driver 12. In addition, the timing controller 11 may provide control signals CTL1 to CTL4 suitable for respective specifications of the data driver 12, the scan driver 13, the sensing circuit 15, and the grayscale converter 18.

In a display period, the data driver 12 may generate data voltages to be provided to data lines (D1, D2, D3, . . . , and Dm) by using the output grayscales GRO and the control signals CTL1 received from the timing controller 11. For example, the data driver 12 may sample the output grayscales GRO by using a clock signal, and may convert the sampled output grayscales GRO into data voltages. The data driver 12 may apply the data voltages to the data lines D1 to Dm in units of pixel rows, where m may be an integer greater than zero. Here, a pixel row means pixels connected to substantially the same scan line. During a sensing period, the data driver 12 may supply reference voltages to the data lines D1 to Dm.

The scan driver 13 may receive a clock signal, a scan start signal, and the like as the control signal CTL2 from the timing controller 11 to generate first scan signals to be provided to first scan lines (S11, S12, . . . , and S1*n*) and second scan signals to be provided to second scan lines (S21, S22, . . . , and S2*n*), where n may be an integer greater than zero.

For example, the scan driver 13 may sequentially supply first scan signals having a turn-on level pulse to the first scan lines S11 to S1$n$. Similarly, the scan driver 13 may sequentially supply second scan signals having a turn-on level pulse to the second scan lines S21 to S2$n$. For example, the scan driver 13 may include a first scan driver connected to the first scan lines S11, S12, and S1$n$ and a second scan driver connected to the second scan lines S21, S22, and S2$n$. Each of the first scan driver and the second scan driver may include scan stages configured in the form of shift registers, without limitation thereto. Each of the first scan driver and the second scan driver may generate the scan signals through a method of sequentially transmitting a scan start signal, which is a pulse type of a turn-on level, to a next scan stage based on the clock signal.

The sensing circuit 15 may receive the control signal CTL3, and during the display period, the sensing circuit 15 may supply an initialization voltage to sensing lines (I1, I2, I3, . . . , and Ip), where p may be an integer greater than zero. During the sensing period, the sensing circuit 15 may receive sensing signals from the sensing lines I1 to Ip connected to pixels.

The sensing circuit 15 may include sensing channels connected to the sensing lines I1 to Ip. For example, the sensing lines I1 to Ip and the sensing channels may correspond one-to-one. For example, the number of the sensing lines I1 to Ip and the number of the sensing channels may be the same. In an embodiment, the number of the sensing channels may be lesser than the number of the sensing lines I1 to Ip. In this case, the sensing circuit 15 may further include demultiplexers to time-divisionally perform sensing of the pixels. The sensing circuit 15 may provide sensing information MBI by using the received sensing signals. That is, the sensing circuit 15 may provide the sensing information MBI generated by sensing the pixels.

The pixel array 14 includes the pixels PXij. The pixels may receive data voltages corresponding to the output grayscales GRO. The pixel array 14 may display images corresponding to the data voltages. Each pixel PXij may be connected to a corresponding data line, scan line, and sensing line. The pixels may be commonly connected to a first power line ELVDD and a second power line ELVSS. For example, during the display period, a voltage of the first power line ELVDD may be greater than a voltage of the second power line ELVSS.

A power current is a current flowing from the first power line ELVDD to the second power line ELVSS. As described above, the first power line ELVDD may be commonly connected to a plurality of pixels, and the second power line ELVSS may also be commonly connected to the plurality of pixels. During the display period, a plurality of driving currents branched from the power current supplied from the first power line ELVDD flows in the plurality of pixels, respectively, and each of the plurality of pixels emits light with luminance corresponding to each driving current. Then, the branched driving currents join the power current again and flow into the second power line ELVSS. For example, an amount of the power current may be substantially the same as a sum of the plurality of driving currents.

The grayscale converter 18 may receive the control signal CTL4, the sensing information MBI and the input grayscales GRI, and generate the output grayscales GRO based on the sensing information MBI and the input grayscales GRI for the pixels. The grayscale converter 18 may receive the input grayscales GRI from the timing controller 11 and convert them into the output grayscales GRO to provide them to the timing controller 11. In an embodiment, the grayscale converter 18 and the timing controller 11 may be configured as an integrated circuit (IC) on a chip. In an embodiment, the grayscale converter 18, the timing controller 11, and the data driver 12 may be configured as an IC. In an embodiment, the grayscale converter 18, the timing controller 11, the data driver 12, and the sensing circuit 15 may be configured as an IC. In an embodiment, the grayscale converter 18 may be integrally configured with the aforementioned processor (e.g., AP, CPU, GPU, or the like). As described above, configuring respective functional portions shown in FIG. 1 by separating or integrating them is within a range that can be easily changed by those skilled in the art, so substantially duplicate description of such cases may be omitted.

Figure 2:
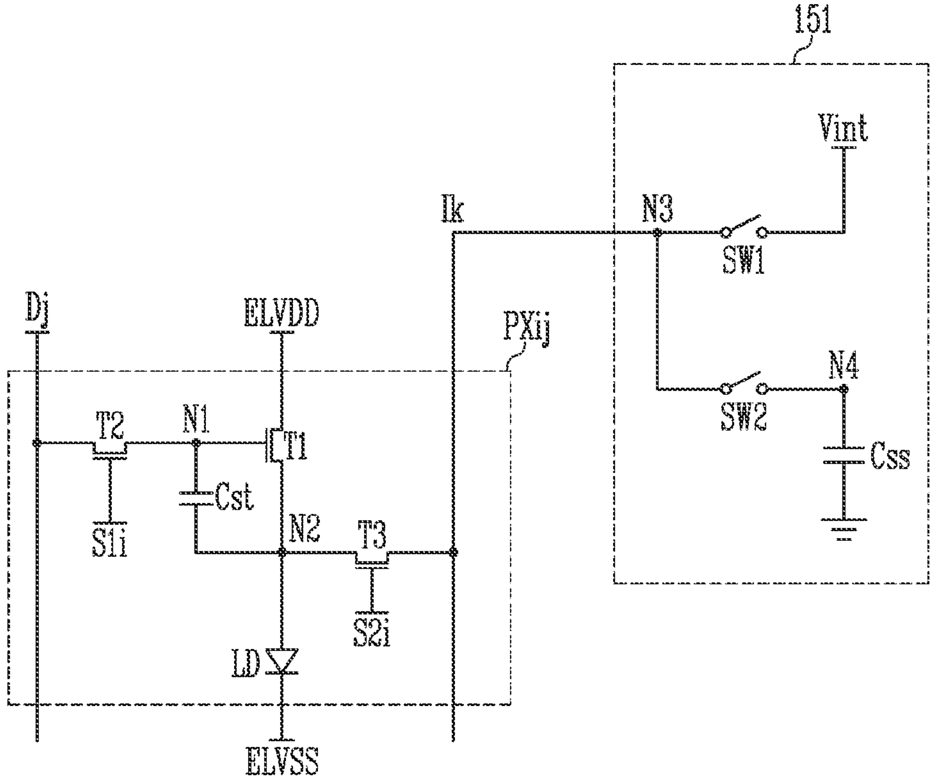
FIG. 2 is a circuit diagram for explaining a pixel and a sensing channel according to an embodiment of the present disclosure.

FIG. 2 is referenced for explaining a pixel and a sensing channel according to an embodiment of the present disclosure.

As shown in FIG. 2, the pixel PXij may include transistors T1, T2, and T3, a storage capacitor Cst, and a light-emitting diode LD.

The transistors T1, T2, and T3 may be configured as N-type transistors. In an embodiment, the transistors T1, T2, and T3 may be configured as P-type transistors. In an embodiment, the transistors T1, T2, and T3 may be configured as a combination of an N-type transistor and a P-type transistor. A P-type transistor refers to a transistor in which an amount of current that is conducted when a voltage difference between a gate terminal and a source terminal increases in a negative direction increases. An N-type transistor refers to a transistor in which an amount of current that is conducted when a voltage difference between a gate terminal and a source terminal increases in a positive direction increases. Each transistor may have one of various kinds or types such as a thin film transistor (TFT), a field-effect transistor (FET), and/or a bipolar junction transistor (BJT).

The first transistor T1 may have a gate electrode connected to a first node N1, a first electrode connected to the first power line ELVDD, and a second electrode connected to a second node N2. The first transistor T1 may be referred to as a driving transistor, without limitation thereto.

The second transistor T2 may have a gate electrode connected to a first scan line S1$i$, a first electrode connected to a data line Dj, and a second electrode connected to the first node N1. The second transistor T2 may be referred to as a scan transistor.

The third transistor T3 may have a gate electrode connected to a second scan line S2$i$, a first electrode connected to the second node N2, and a second electrode connected to a sensing line Ik. The third transistor T3 may be referred to as a sensing transistor.

The storage capacitor Cst may have a first electrode connected to the first node N1 and a second electrode connected to the second node N2.

The light-emitting diode LD may have an anode connected to the second node N2 and a cathode connected to the second power line ELVSS.

Generally, a voltage of the first power line ELVDD may be greater than a voltage of the second power line ELVSS. However, in a situation such as preventing the light-emitting diode LD from being emitted, the voltage of the second power line ELVSS may be set to be substantially equal or higher than the voltage of the first power line ELVDD.

A sensing channel 151 may include a first switch SW1 and a second switch SW2, and may further include a sensing capacitor Css, without limitation thereto.

A first electrode of the first switch SW1 may be connected to a third node N3. For example, the third node N3 may correspond to at least a portion of the sensing line Ik. A second electrode of the first switch SW1 may receive an initialization voltage Vint. For example, the second electrode of the first switch SW1 may be connected to an initialization power source supplying the initialization voltage Vint.

A first electrode of the second switch SW2 may be connected to the third node N3, and a second electrode of the second switch SW2 may be connected to a fourth node N4.

The sensing capacitor Css may have a first electrode connected to the fourth node N4 and a second electrode connected to a reference power source (e.g., the ground voltage potential).

In an embodiment, a sensing circuit 15 may include the sensing channel 151 and an analog-to-digital converter. For example, the sensing circuit 15 may include analog-to-digital converters corresponding to the number of sensing channels. The analog-to-digital converter may convert a substantially analog sensing voltage stored in the sensing capacitor Css into a digital value. The converted digital value may be provided to the timing controller 11. In another example, the sensing circuit 15 may include fewer analog-to-digital converters than the number of sensing channels, and may time-divisionally convert the sensing signals stored in the sensing channels.

Figure 3:
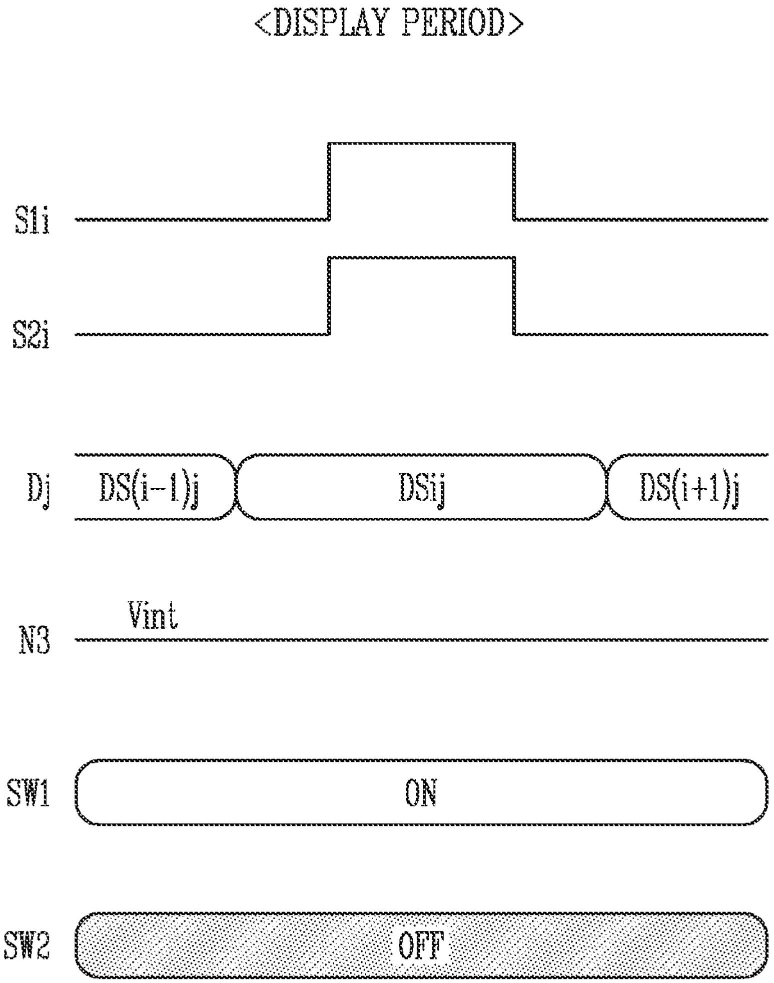
FIG. 3 is a timing diagram for explaining a display period according to an embodiment of the present disclosure.

FIG. 3 is referenced for explaining a display period according to an embodiment of the present disclosure.

Referring to FIG. 3, during the display period, the sensing line Ik, such as the third node N3 of FIG. 2, may receive the initialization voltage Vint. For example, the first switch SW1 may be in a turn-on state, and the second switch SW2 may be in a turn-off state.

During the display period of FIG. 3, data voltages (DS(i−1)j, DSij, and DS(i+1)j) may be sequentially applied to the data line Dj in units of horizontal periods. A first scan signal of a turn-on level (e.g., a logic high level) may be applied to the first scan line S1*i* in the corresponding horizontal period. A second scan signal of a turn-on level may be applied to the second scan line S2*i* in synchronization with the first scan line S1*i*. In an embodiment, during the display period, the second scan line S2*i* may always be in a state in which the second scan signal of the turn-on level is applied thereto.

For example, when the scan signals of the turn-on level are applied to the first scan line S1*i* and to the second scan line S2*i*, the second transistor T2 and the third transistor T3 may be turned on. Accordingly, a voltage corresponding to a difference between the data voltage DSij and the initialization voltage Vint is written into the storage capacitor Cst of the pixel PXij.

In the pixel PXij, an amount of a driving current flowing through a driving path connecting the first power line ELVDD, the first transistor T1, the light-emitting diode LD, and the second power line ELVSS may be determined according to a voltage difference between the gate electrode and the source electrode of the first transistor T1. Light-emitting luminance of the light-emitting diode LD may be determined according to the amount of the driving current.

Thereafter, when the scan signal of the turn-off level (e.g., a logic low level) is applied to the first scan line S1*i* and the second scan line S2*i*, the second transistor T2 and the third transistor T3 may be turned off. Accordingly, regardless of the voltage change of the data line Dj, the voltage difference between the gate electrode and the source electrode of the first transistor T1 may be maintained or preserved by the storage capacitor Cst, and the light-emitting luminance of the light-emitting diode LD may be maintained or preserved.

Figure 4:
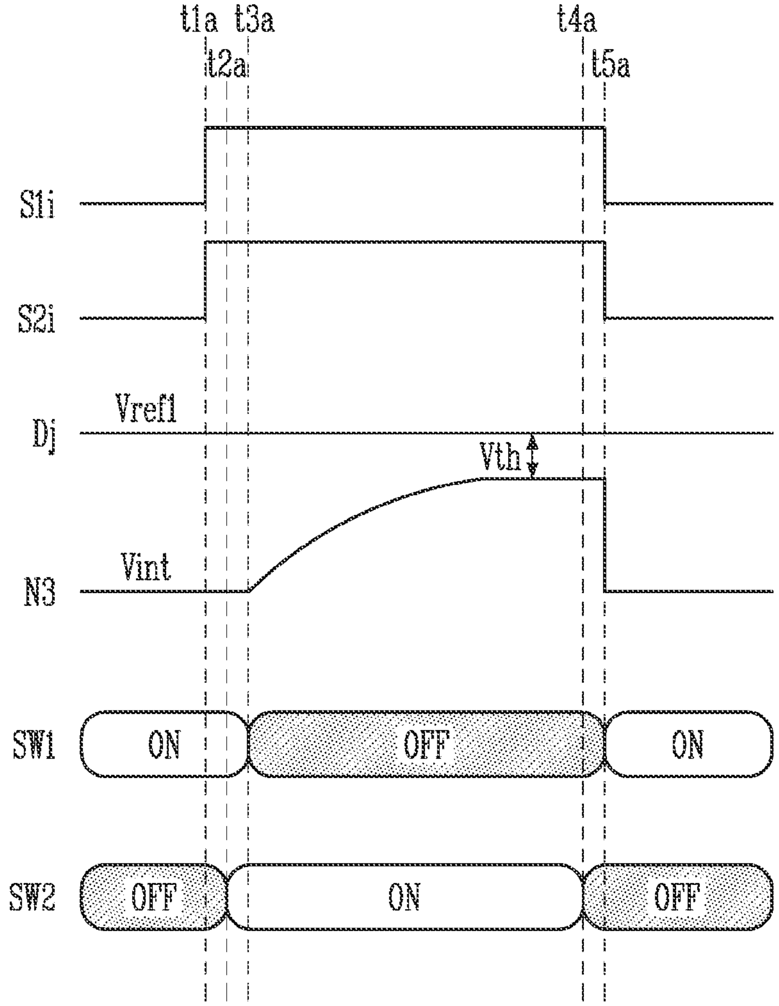
FIG. 4 is a timing diagram for explaining a threshold voltage sensing period of a transistor according to an embodiment of the present disclosure.

FIG. 4 is referenced for explaining a threshold voltage sensing period of a transistor according to an embodiment of the present disclosure.

As shown in FIG. 4, before a time point t1*a*, the first switch SW1 may be in a turn-on state, and the second switch SW2 may be in a turn-off state. Accordingly, the initialization voltage Vint may be applied to the third node N3. In addition, the data driver 12 may supply a reference voltage Vref1 to the data line Dj.

At the time point t1*a*, the first scan signal of the turn-on level may be supplied to the first scan line S1*i*, and the second scan signal of the turn-on level may be supplied to the second scan line S2*i*. Accordingly, the reference voltage Vref1 may be applied to the first node N1 of FIG. 2, and the initialization voltage Vint may be applied to the second node N2 of FIG. 2. Accordingly, the first transistor T1 may be turned on according to the difference between the gate voltage and the source voltage.

At a time point t2*a*, the second switch SW2 may be turned on. Thus, the first electrode of the sensing capacitor Css may be initialized to the initialization voltage Vint.

At a time point t3*a*, the first switch SW1 may be turned off. Accordingly, as a current is supplied from the first power line ELVDD, voltages of the second node N2 and the third node N3 of FIG. 2 may increase. When the voltages of the second node N2 and the third node N3 increase to a voltage (Vref1−Vth), the first transistor T1 is turned off, so the voltages of the second node N2 and the third node N3 do not increase any more. Since the fourth node N4 is connected to the third node N3 through the turned-on second switch SW2, the sensing voltage (Vref1−Vth) is stored in the first electrode of the sensing capacitor Css.

At a time point t4*a*, the second switch SW2 is turned off, so that the sensing voltage (Vref1−Vth) of the first electrode of the sensing capacitor Css may be maintained or preserved. The sensing circuit 15 may convert the sensing voltage (Vref1−Vth) to an analog-to-digital value, and thus may determine a threshold voltage Vth of the first transistor T1 of the pixel PXij.

At a time point t5*a*, the first scan signal of the turn-off level may be supplied to the first scan line S1*i*, and the second scan signal of the turn-off level may be supplied to the second scan line S2*i*. In addition, the first switch SW1 may be turned on. Accordingly, the initialization voltage Vint may be applied to the third node N3.

Figure 5:
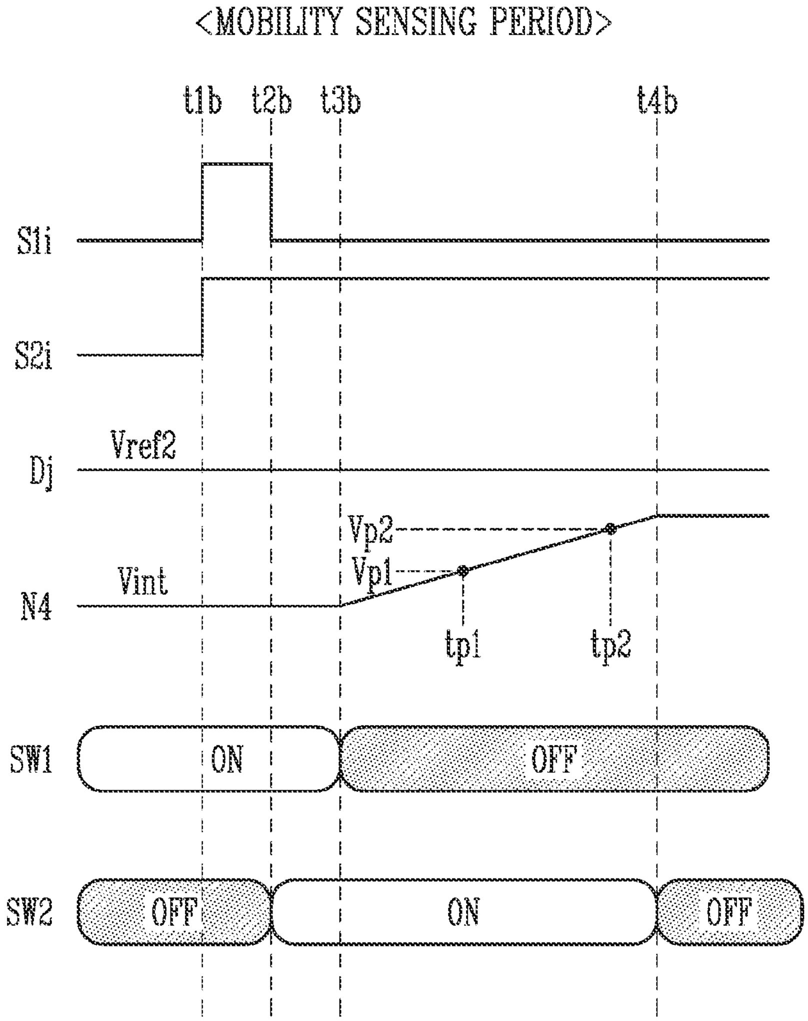
FIG. 5 is a timing diagram for explaining a mobility sensing period according to an embodiment of the present disclosure.

FIG. 5 is referenced for explaining a mobility sensing period according to an embodiment of the present disclosure.

Referring to FIG. 5, at a time point t1*b*, the first scan signal of the turn-on level may be applied to the first scan line S1*i*, and the second scan signal of the turn-on level may be applied to the second scan line S2*i*. In this case, since a reference voltage Vref2 is applied to the data line Dj, the reference voltage Vref2 may be applied to the first node N1 of FIG. 2. In addition, since the first switch SW1 is in a turn-on state, the initialization voltage Vint may be applied to the second node N2 of FIG. 2 and the third node N3 of FIG. 2. Accordingly, the first transistor T1 may be turned on according to the difference between the gate voltage and the source voltage.

At a time point t2*b*, as the first scan signal of the turn-off level is applied to the first scan line S1*i*, the first node N1 may have or be in a floating state. In addition, as the second switch SW2 is turned on, the initialization voltage Vint may be applied to the fourth node N4.

At a time point t3*b*, the first switch SW1 may be turned off. Accordingly, as a current is supplied from the first power line (ELVDD) through the first transistor T1, the voltages of the second, third, and fourth nodes N2, N3, and N4 increase. In this case, since the first node N1 is in a floating state, the voltage difference between the gate and the source of the first transistor T1 may be maintained or preserved.

At a time point t4*b*, the second switch SW2 may be turned off. Thus, a sensing voltage is stored in the first electrode of the sensing capacitor Css. A sensing current of the first transistor T1 may be obtained as in Equation 1 below.

$$I=C*(Vp2-Vp1)/(tp2-tp1) \quad \text{[Equation 1]}$$

Here, I is a sensing current of the first transistor T1, C is a capacitance of the sensing capacitor Css, Vp2 is a sensing voltage at a time point tp2, and Vp1 is a sensing voltage at a time point tp1.

For example, if a voltage slope of the fourth node N4 between the time points t3*b* and t4*b* is linear, the sensing voltage at the time point t3*b* and the sensing voltage at the time point t4*b* may be easily known, so that the sensing current of the first transistor T1 may be easily calculated. But the present disclosure is not limited thereto. For example, a sensing current may be similarly calculated for non-linear voltage curves of the fourth node In addition, a mobility of the first transistor T1 may be calculated by using the calculated sensing current. For example, the greater the sensing current, the greater the mobility. IN an embodiment, the mobility may be proportional to an amount of the sensing current.

Figure 6:
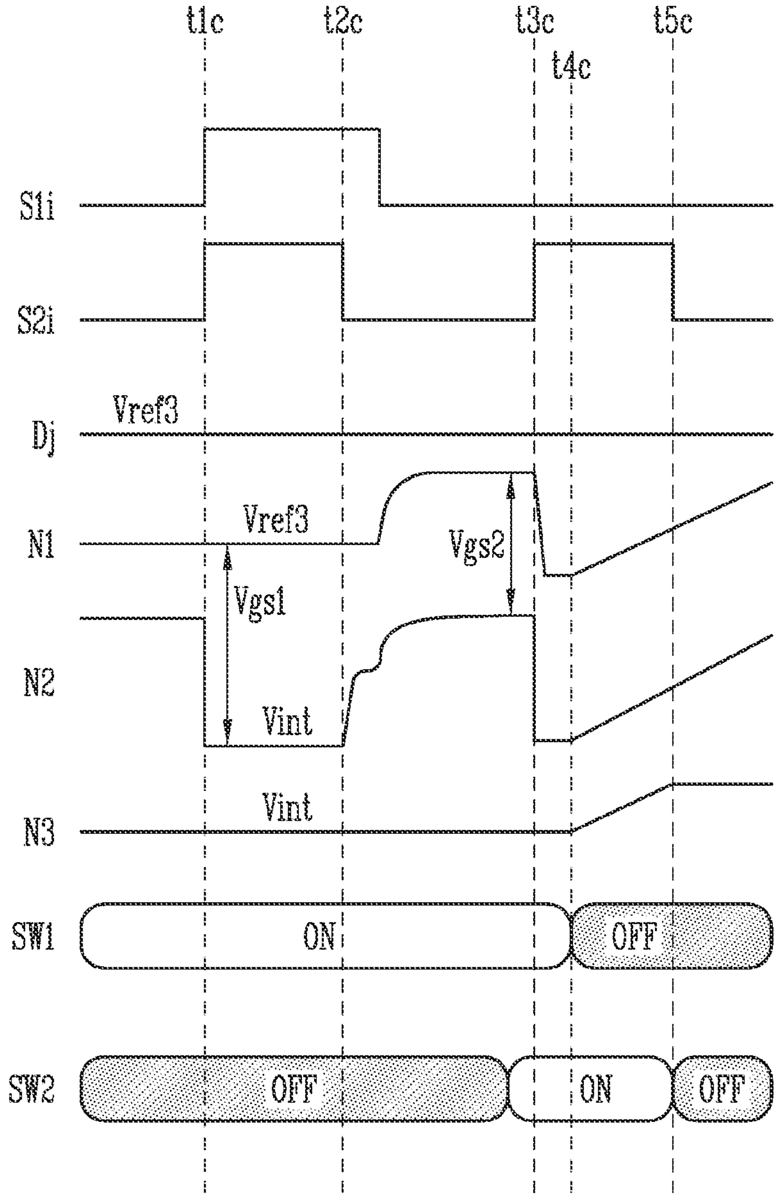
FIG. 6 is a timing diagram for explaining a threshold voltage sensing period of a light-emitting diode according to an embodiment of the present disclosure.

FIG. 6 is referenced for explaining a threshold voltage sensing period of a light-emitting diode according to an embodiment of the present disclosure.

As shown in FIG. 6, at a time point t1*c*, the first scan signal of the turn-on level may be applied to the first scan line S1*i*, and the second scan signal of the turn-on level may be applied to the second scan line S2*i*. In this case, since a reference voltage Vref3 is applied to the data line Dj, the reference voltage Vref3 may be applied to the first node N1 of FIG. 2. In an embodiment, since the first switch SW1 is in a turn-on state, the initialization voltage Vint may be applied to the second node N2 and the third node N3. Accordingly, the first transistor T1 may be turned on according to a first or preset gate-source voltage Vgs1.

At a time point t2*c*, the second scan signal of the turn-off level may be applied to the second scan line S2*i*. In addition, at or immediately after a time point t2*c*, the first scan signal of the turn-off level may be applied to the first scan line S1*i*. In this case, the voltage of the second node N2 increases by the current supplied from the first power line ELVDD. In addition, the voltage of the first node N1, which is coupled to the second node N2 and is in a floating state, also increases. In this case, the voltage of the second node N2 is saturated at a voltage corresponding to the threshold voltage of the light-emitting diode LD. As a degree of deterioration of the light-emitting diode LD increases, the voltage of the saturated second node N2 may increase. A second or reset gate-source voltage Vgs2 of the first transistor T1 may be reset by the voltage of the saturated second node N2. For example, the reset gate-source voltage Vgs2 may be lower than the preset gate-source voltage Vgs1.

At a time point t3*c*, the second scan signal of the turn-on level may be applied to the second scan line S2*i*. Accordingly, the initialization voltage Vint may be applied to the second node N2. In this case, the reset gate-source voltage Vgs2 may be maintained or preserved by the storage capacitor Cst.

At a time point t4*c*, the first switch SW1 may be turned off. In this case, since second switch SW2 is in a turn-on state, the voltages of the second node N2, the third node N3, and the fourth node N4 may increase. As the degree of deterioration or the threshold voltage of the light-emitting diode LD increases, the voltage increase slope may decrease.

At a time point t5*c*, the second scan signal of the turn-off level is applied to the second scan line S2*i*, and the second switch SW2 may be turned off. Accordingly, the threshold voltage of the light-emitting diode LD may be calculated by using the sensing voltage stored in the sensing capacitor Css.

Figure 7:
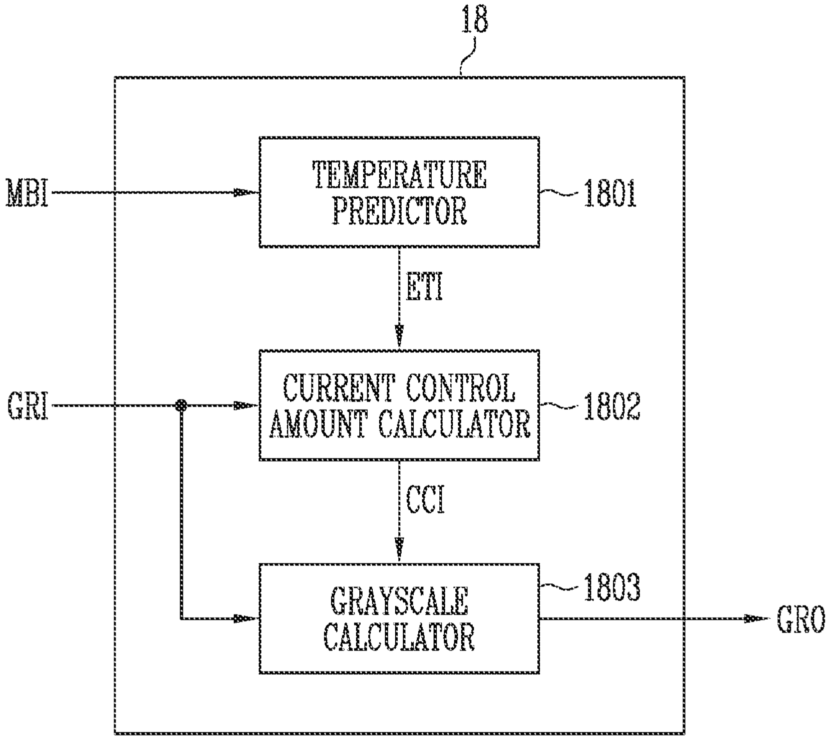
FIG. 7 is a block diagram for explaining a grayscale converter according to an embodiment of the present disclosure.

FIG. 7 is referenced for explaining a grayscale converter according to an embodiment of the present disclosure.

Referring to FIG. 7, the grayscale converter 18 may predict a temperature ETI of the pixels based on the sensing information MBI, may calculate a current control amount CCI based on the predicted temperature ETI and the input grayscales GRI, and may output grayscales GRO based on the current control amount CCI and the input grayscales GRI. Referring to FIG. 7, the grayscale converter 18 according to an embodiment of the present disclosure may include a temperature predictor 1801, a current control amount calculator 1802, and a grayscale calculator 1803. The sensing information MBI may be or include the threshold voltage of the first transistor T1, the mobility of the first transistor T1, and/or the threshold voltage of the light-emitting diode as may be described in greater detail, supra, such as with reference to FIG. 4, FIG. 5, and/or FIG. 6. Hereinafter, it is assumed for ease of description that the sensing information MBI is the mobility of the driving transistor (e.g., the first transistor T1) included in each of the pixels, without limitation thereto.

The temperature predictor 1801 may substantially predict the temperature ETI of the corresponding pixels as the mobility indicated by the sensing information MBI increases or decreases. A relationship between the mobility and the temperature ETI may vary depending on specifications of the pixel array 14. For example, the mobility and the temperature ETI may be directly proportional, or may be proportional in the form of an exponential function or a logarithmic function.

The current control amount calculator 1802 may calculate the current control amount CCI as the predicted temperature ETI increases or decreases and the input grayscales GRI increases or decreases. The current control amount CCI may be an index indicating a degree at which current control is required. A positive current control amount CCI may indicate that a power current greater than a target current relative to the input grayscale GRI is flowing in the pixel array 14. A negative current control amount CCI may indicate that a current lesser than a target current relative to the input grayscale GRI is flowing in the pixel array 14. The target current is an amount of current appropriate to flow through the pixel array 14 for the input grayscales GRI configuring an image frame, and may be previously calibrated in the manufacturing process of the display device 10.

The grayscale calculator 1803 may calculate that a difference between the input grayscales GRI and the output grayscales GRO increases or decreases as an absolute value of the current control amount CCI increases or decreases. For example, the grayscale calculator 1803 may calculate the output grayscales GRO to be lesser than the input grayscales GRI as the current control amount CCI has a positive value and the absolute value thereof increases. In an embodiment, the grayscale calculator 1803 may calculate the output grayscales GRO to be greater than the input grayscales GRI as the current control amount CCI has a negative value and the absolute value thereof increases. For example, the grayscale calculator 1803 may calculate the output grayscales GRO according to the following Equation 2.

$$GROq=GRIq*100/(CC1+100) \quad \text{[Equation 2]}$$

Here, GRIq is one of the input grayscales GRI and corresponds to one pixel, GROq is one of the output grayscales GRO and corresponds to substantially the same pixel as GRIq, and CCI corresponds to the current control amount CCI. In an embodiment, the current control amount CCI may be commonly applied to substantially all pixels of the pixel array 14.

According to the present embodiment, although the display device 10 need not be provided with a temperature sensor and a current sensor, the power current of the display device 10 may be controlled to converge to a target current.

Figure 8:
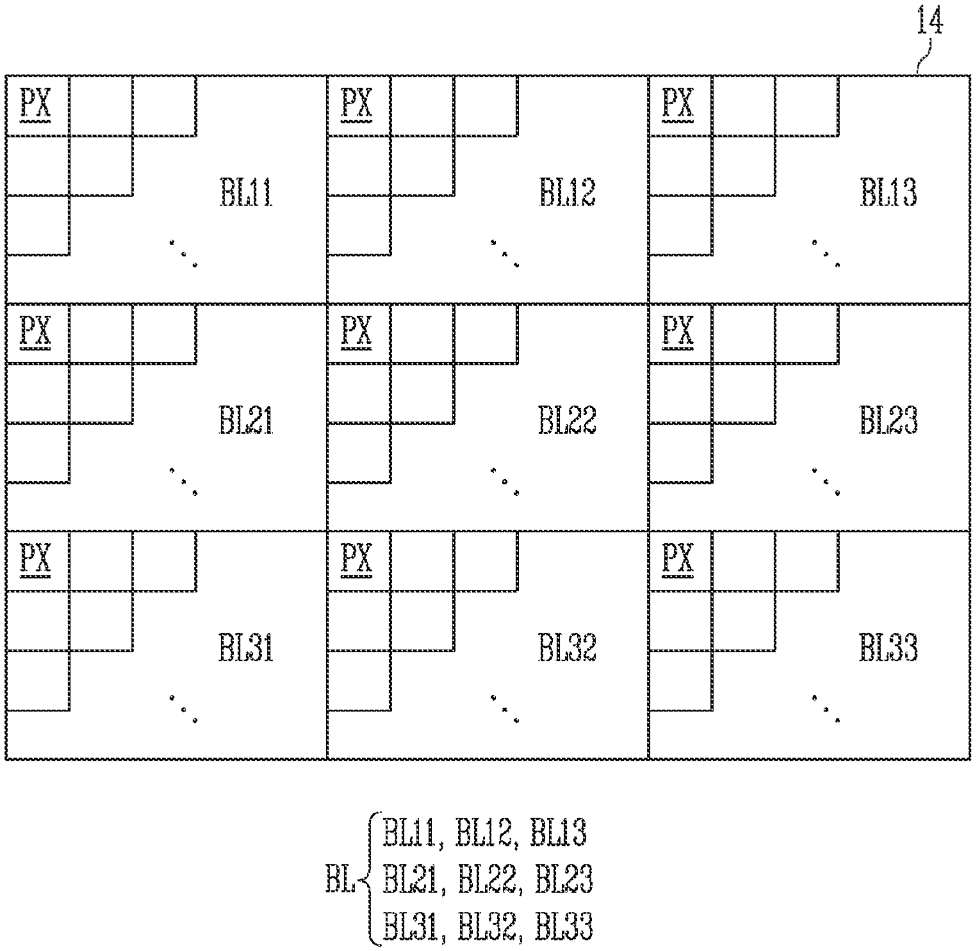
FIG. 8 is a layout diagram for explaining blocks according to an embodiment of the present disclosure.

FIG. 8 is referenced for explaining blocks according to an embodiment of the present disclosure.

As shown in FIG. 8, the pixels PX included in the pixel array 14 may be partitioned into a plurality of blocks BL11, BL12, BL13, BL21, BL22, BL23, BL31, BL32, and BL33. For example, each of the blocks BL11 to BL33 may include substantially the same number of pixels PX, and the blocks BL11 to BL33 need not overlap each other. In an embodiment, the blocks BL11 to BL33 may include different numbers of pixels PX. In an embodiment, the blocks BL11 to BL33 may overlap and/or share (e.g., at least some pixels PX.

The block BL is a substantially virtual element defining a control unit for a plurality of pixels PX, and need not be a physical constituent element. The block BL may be defined and saved in a memory before product shipment, and/or may be actively redefined during product use.

In FIG. 8, the blocks BL11 to BL33 are illustrated as arranged into three (3) rows and three (3) columns for better understanding and ease of description, but the number and arrangement of the blocks BL is not limited thereto, and may be variously changed in accordance with design criteria or specifications (e.g., a size, a resolution, and the like) of the pixel array 14.

For example, if it is assumed that the number of the pixels PX of the pixel array 14 is 3840*2160, then each block BL may include various numbers of the pixels PX, such as 240*120, 8*8, or 1*1, according to embodiments. When the number of the pixels PX included in each block BL decreases, the local accuracy of prediction or calculation may increase, but since the total number of the blocks BL11 to BL33 increases, the amount of calculation may increase.

Figure 9:
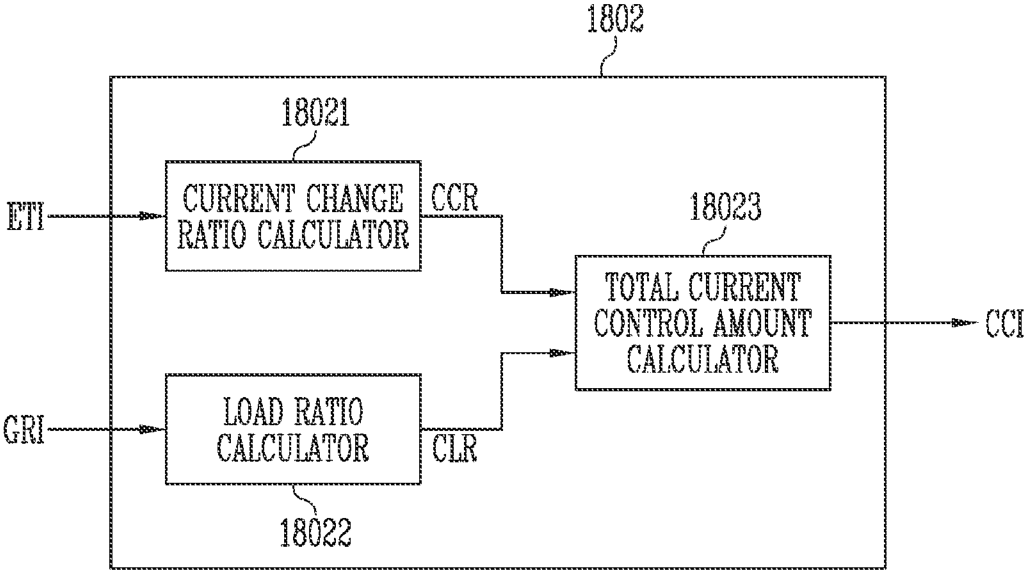
FIG. 9 is a block diagram for explaining a current control amount calculator according to an embodiment of the present disclosure.

FIG. 9 is referenced for explaining a current control amount calculator according to an embodiment of the present disclosure.

Referring to FIG. 9, the current control amount calculator 1802 may calculate the current control amount CCI in units corresponding to the blocks BL11 to BL33, in which the pixels PX are partitioned. Referring to FIG. 9, the current control amount calculator 1802 may include a current change ratio calculator 18021, a load ratio calculator 18022, and a total current control amount calculator 18023.

The current change ratio calculator 18021 may calculate a current change ratio CCR greater or lesser as the predicted temperature ETI is greater or lesser, respectively, for each of the blocks BL11 to BL33. For example, the temperature predictor 1801 may calculate an average of the mobilities of the pixels PX included in the block BL, and may predict and provide the temperature ETI of the block BL for the average mobility. For another example, the temperature predictor 1801 may predict and provide the temperatures ETI for the pixels PX, and the current change ratio calculator 18021 may calculate the current change ratio CCR with respect to an average temperature of the temperatures ETI of the pixels PX included in the block BL.

Figure 10:
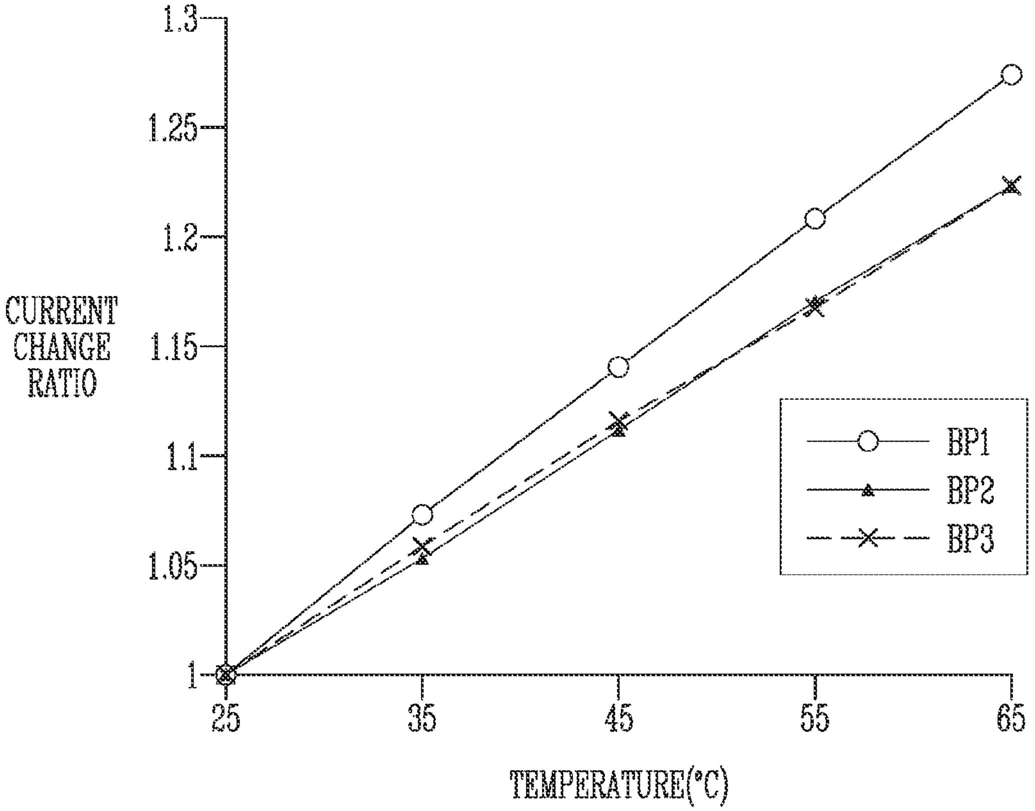
FIG. 10 is a graphical diagram for explaining a current change ratio according to temperature according to an embodiment of the present disclosure.

FIG. 10 is referenced for explaining current change ratio versus temperature according to an embodiment of the present disclosure.

As shown in FIG. 10, graphs of current change ratios CCR to temperatures are illustrated for the pixel blocks BP1, BP2, and BP3 having different specifications. These graphs may be experimentally calculated through simulation or calculated through measurement in the manufacturing process of the display device 10. The graphs of current change ratio versus temperature need not be linear. For example, the graph for at least one of block BP2 or block BP3 may be non-linear.

When the current change ratio CCR is set to 1 based on 25 degrees Celsius, it can be confirmed that the current change ratio CCR increases as the temperature increases. However, slopes of the graphs may be different according to various specifications of the pixel blocks BP1, BP2, and BP3. In FIG. 10, the graphs have the form of a primary function, but the present disclosure is not limited thereto. Graphs of current change ratio versus temperature for other specifications or blocks may have the form of a secondary function, an exponential function, a log function, or the like, according to embodiments.

Considering actual use environments, the temperature may be in a range of 25 degrees to 65 degrees Celsius, for example, and the current change ratio CCR may have a range of about 1 to 1.3. In an embodiment, the temperature range and the current change ratio CCR range may be increased in consideration of harsher environments (e.g., extremely cold or extremely hot). For example, the current change ratio CCR may be lesser than 1 or greater than 1.3.

For each of the blocks BL11 to BL33, the load ratio calculator 18022 may calculate a load ratio CLR that is a ratio of the input grayscales GRI of each block BL to the input grayscales GRI of substantially all pixels PX (e.g., the pixel array 14). The load ratio CLR of each block BL may be in a range of 0 or more to 1 or less. For example, the load ratio calculator 18022 may calculate the load ratio CLR of each block BL by the following Equation 3.

$$CLRq=GRI\_BL/GRI\_ENT \quad \text{[Equation 3]}$$

Here, GRI_ENT is a sum of the input grayscales GRI for substantially all of the pixels PX, GRI_BL is a sum of the input grayscales GRI for the corresponding block BL, and CLRq is a load ratio CLR of the corresponding block BL. For example, the sum of the load ratios CLR of the blocks BL11 to BL33 may be substantially equal to one (1).

The total current control amount calculator 18023 may calculate the current control amount CCI by multiplying the current change ratio CCR and the load ratio CLR for respective blocks BL11 to BL33, and summing the respective values obtained.

According to the present embodiment, since the calculation is performed for each of the blocks BL11 to BL33 rather than each of the pixels PX, the amount of calculation may be reduced.

In an embodiment, the sensing information for at least one of the pixels includes at least one of a mobility of a respective driving transistor, a threshold voltage of the respective driving transistor, or a threshold voltage of a respective light-emitting diode.

In an embodiment, the grayscale converter includes a temperature predictor that predicts a temperature of the at least one of the pixels to increase or decrease as the corresponding mobility increases or decreases, respectively.

In an embodiment, the grayscale converter includes a current control amount calculator that calculates the current control amount of the at least one of the pixels to increase or decrease as the predicted temperature and the input grayscales increase or decrease, respectively.

In an embodiment, the grayscale converter further includes a grayscale calculator that calculates a difference between the input grayscales and the output grayscales to increase or decrease as an absolute value of the current control amount increases or decreases, respectively.

In an embodiment, the grayscale calculator calculates the output grayscales to decrease versus the input grayscales as the absolute value of the current control amount increases when the current control amount has a positive value, and the grayscale calculator calculates the output grayscales to increase versus the input grayscales as the absolute value of the current control increases when the current control amount has a negative value.

In an embodiment, the grayscale converter includes a current control amount calculator that calculates the current control amount in units of blocks partitioning the pixels, and the at least one of the pixels comprises a block.

In an embodiment, the current control amount calculator includes a current change ratio calculator that calculates a current change ratio for each of the blocks to increase as the predicted temperature increases.

In an embodiment, the current control amount calculator further includes a load ratio calculator that calculates a load ratio for each of the blocks as a ratio of the input grayscales of each respective block to the input grayscales of substantially all of the pixels.

In an embodiment, the current control amount calculator further includes a total current control amount calculator that calculates the current control amount for each of the blocks by summing values obtained by multiplying the current change ratio and the load ratio.

Figure 11:
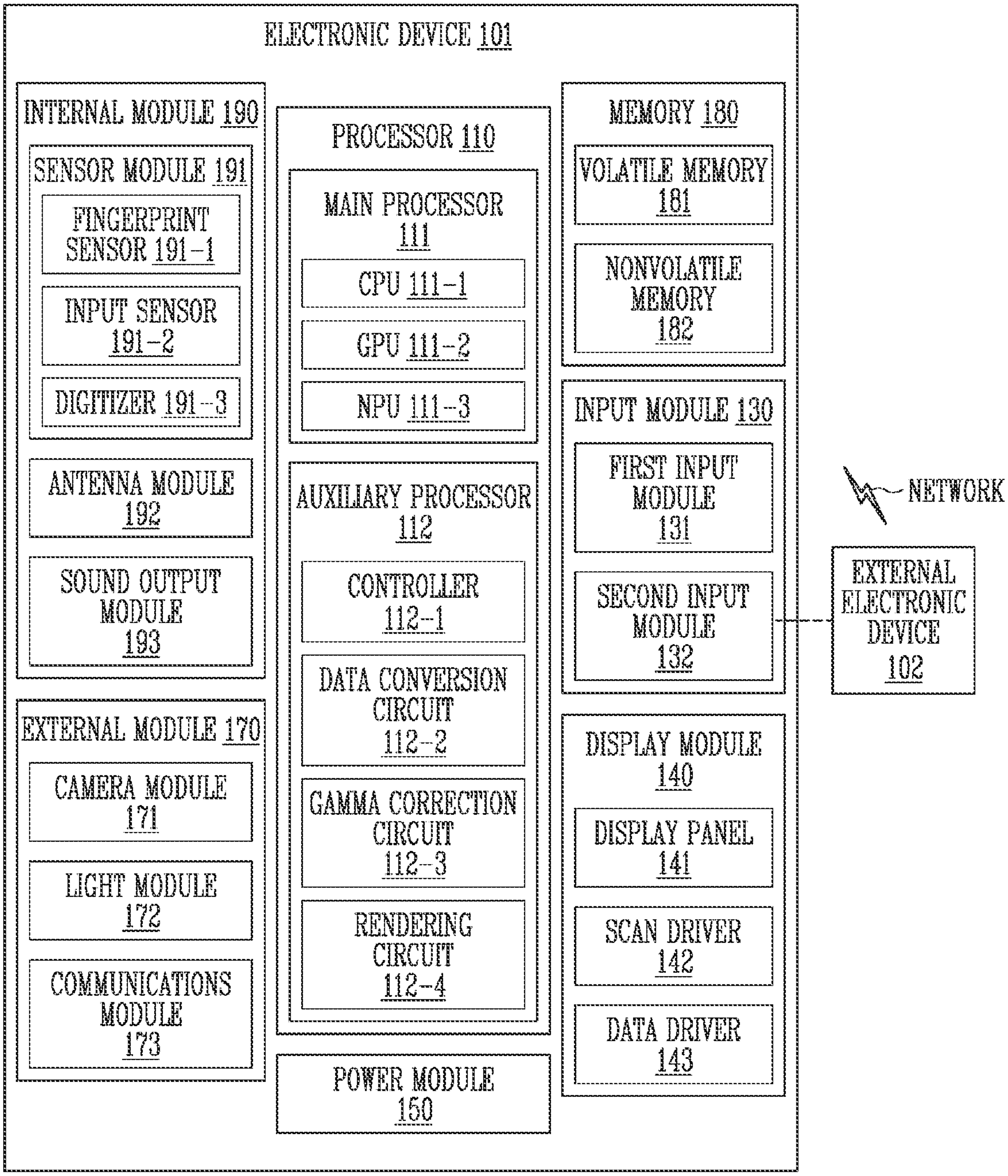
FIG. 11 is a block diagram of an electronic device according to embodiments of the present disclosure.

FIG. 11 illustrates an electronic device according to an embodiment of the present disclosure.

Referring to FIG. 11, an electronic device 101 outputs various information through a display module 140 within an operating system. When a processor 110 executes an application stored in a memory 180, the display module 140 provides application information to a user through a display panel 141.

In an embodiment, the processor 110 obtains external input through an input module 130 or a sensor module 191, and executes an application corresponding to the external input. For example, when a user selects a camera icon displayed on the display panel 141, the processor 110 obtains user input through an input sensor 191-2 and activates a camera module 171. The processor 110 transmits image data corresponding to a captured image obtained through the camera module 171 to the display module 140. The display module 140 may display an image corresponding to the captured image through the display panel 141.

As another example, when personal information authentication is executed in the display module 140, a fingerprint sensor 191-1 obtains inputted fingerprint information as input data. The processor 110 compares the inputted data obtained through the fingerprint sensor 191-1 with authentication data stored in the memory 180, such as in the non-volatile memory 182, and executes an application according to the compared result. The display module 140 may display information from the executed application according to application logic through the display panel 141.

As another example, when a music streaming icon displayed on the display module 140 is selected, the processor 110 obtains user input through the input sensor 191-2 and activates a music streaming application stored in the memory 180. When a music execution instruction is inputted from the music streaming application, the processor 110 activates a sound output module 193 to provide sound information to the user corresponding to the music execution instruction.

In the above description, the operation of the electronic device 101 has been briefly described by way of example with reference to an illustrated embodiment. Hereinafter, a configuration of the electronic device 101 may be described in greater detail. Some of components of the electronic device 101 to be described may be integrated and provided as an integrated component, and a component thereof may be divided and provided as two or more components, without limitation thereto.

Referring to FIG. 11, the electronic device 101 may communicate with an external electronic device 102 through a network (e.g., a short range wireless communications network or a long range wireless communications network). According to an embodiment, the electronic device 101 may include the processor 110, the memory 180, the input module 130, the display module 140, a power module 150, an embedded module 190, and an external module 170. According to an embodiment, in the electronic device 101, at least one of the aforementioned constituent elements may be omitted, or one or more other constituent elements may be added. According to an embodiment, some (e.g., the sensor module 191, an antenna module 192, or a sound output module 193) of the aforementioned constituent elements may be integrated into another constituent element (e.g., the display module 140).

The processor 110 may execute software to control at least one other constituent element (e.g., a hardware or software constituent element) of the electronic device 101 connected to the processor 110, and may perform various data processing or calculations. According to an embodiment, as at least some of the data processing or operation, the processor 110 may store an instruction or data received from other constituent element (e.g., the input module 130, the sensor module 191, or a communications module 173) in a volatile memory 181, may process the instructions or data stored in the volatile memory 181, and may store the result data in a non-volatile memory 182.

The processor 110 may include a main processor 111 and an auxiliary processor 112. The main processor 111 may include one or more of a central processing unit (CPU) 111-1 and an application processor (AP). The main processor 111 may further include one or more of a graphic processing unit (GPU) 111-2, a communications processor (CP), and an image signal processor (ISP). The main processor 111 may further include a neural processing unit (NPU) 111-3. The neural processing unit is a processor specialized in processing an artificial intelligence model, and the artificial intelligence model may be generated through machine learning. The artificial intelligence model may include a plurality of artificial neural layers. The artificial neural network may be one of a deep neural network (DNN), a convolutional neural network (CNN), a recurrent neural network (RNN), a restricted Boltzmann machine (RBM), a deep belief network (DBN), a bidirectional recurrent deep neural network (BRDNN), a deep Q-network, and a combination of two or more thereof, but is not limited to the above example. The artificial intelligence models may additionally or alternatively include a software structure in addition to the hardware structure thereof. At least two of the aforementioned processing units and processors may be implemented as an integrated component (e.g., a single chip), or each thereof may be implemented as an independent component (e.g., a plurality of chips).

The auxiliary processor 112 may include a controller 112-1

The controller 112-1 may include an interface conversion circuit and a timing control circuit. The controller 112-1 receives an image signal from the main processor 111, and converts a data format of the image signal to meet an interface specification with the display module 140 to output image data. The controller 112-1 may output various control signals necessary for driving the display module 140.

The auxiliary processor 112 may further include a data conversion circuit 112-2 a gamma correction circuit 112-3 a rendering circuit 112-4 and the like. The data conversion circuit 112-2 may receive image data from the controller 112-1 and it may compensate the image data to display the image with a desired luminance according to characteristics of the electronic device 101 or a user's setting, or convert the image data to reduce power consumption or compensate for an afterimage. The gamma correction circuit 112-3 may convert the image data or gamma reference voltage so that the image displayed on the electronic device 101 has a desired gamma characteristic. The rendering circuit 112-4 may receive image data from the controller 112-1 and render the image data in consideration of pixel disposition of the display panel 141 applied to the electronic device 101. At least one of the data conversion circuit 112-2 the gamma correction circuit 112-3 and the rendering circuit 112-4 may be incorporated into another constituent element (e.g., the main processor 111 or the controller 112-1). At least one of the data conversion circuit 112-2 the gamma correction circuit 112-3 and the rendering circuit 112-4 may be integrated into a data driver 143 to be described later.

The memory 180 may store various data used by at least one constituent element (e.g., the processor 110 or the sensor module 191) of the electronic device 101, and input data or output data for an instruction related thereto. The memory 180 may include at least one or more of the volatile memory 181 and the non-volatile memory 182.

The input module 130 may receive an instruction or data to be used for a constituent element (e.g., the processor 110, the sensor module 191, or the sound output module 193) of the electronic device 101 from the outside of the electronic device 101 (e.g., a user or the external electronic device 102).

The input module 130 may include a first input module 131 to which an instruction or data is inputted from a user and a second input module 132 to which an instruction or data is inputted from the external electronic device 102. The first input module 131 may include a microphone, a mouse, a keyboard, a key (e.g., a button), or a pen (e.g., a passive pen or active pen). The second input module 132 may support a designated protocol that may be connected to the external electronic device 102 by wire or wirelessly. According to an embodiment, the second input module 132 may include a high definition multimedia interface (HDMI), a universal serial bus (USB) interface, an SD card interface, or an audio interface. The second input module 132 may include a connector that may be physically connected to the external electronic device 102, for example, an HDMI connector, a USB connector, an SD card connector, or an audio connector (e.g., a headphone connector).

The display module 140 visually provides information to the user. The display module 140 may include a display panel 141, a scan driver 142, and a data driver 143. The display module 140 may further include a window, a chassis, and a bracket to protect the display panel 141.

The display panel 141 may include a liquid crystal display panel, an organic light-emitting display panel, or an inorganic light-emitting display panel, and the type of display panel 141 is not particularly limited. The display panel 141 may be a rigid type, or a flexible type that may be rolled or folded. The display module 140 may further include a supporter, a bracket, or a heat dissipation member for supporting the display panel 141.

The scan driver 142 may be mounted on the display panel 141 as a driving chip. In addition, the scan driver 142 may be integrated in the display panel 141. For example, the scan driver 142 includes an amorphous silicon TFT gate driver circuit (ASG), a low temperature polycrystalline silicon (LTPS) TFT gate driver circuit, or an oxide semiconductor TFT gate driver circuit (OSG) that is embedded in the display panel 141. The scan driver 142 receives a control signal from the controller 112-1, and outputs scan signals to the display panel 141 in response to the control signal.

The display panel 141 may further include a light-emitting driver. The light-emitting driver outputs a light-emitting control signal to the display panel 141 in response to the control signal received from the controller 112-1

The light-emitting driver may be formed separately from the scan driver 142, or may be integrated in the scan driver 142.

The data driver 143 receives a control signal from the controller 112-1 converts image data into an analog voltage (e.g., a data voltage) in response to the control signal, and then outputs data voltages to the display panel 141.

The data driver 143 may be incorporated into other constituent elements (e.g., the controller 112-1). The functions of the interface conversion circuit and the timing control circuit of the controller 112-1 described above may be integrated into the data driver 143.

The display module 140 may further include a light-emitting driver and a voltage generating circuit. The voltage generating circuit may output various voltages required for driving the display panel 141.

The power module 150 may supply power to the constituent elements of the electronic device 101. The power module 150 may include a battery in which a power voltage is charged. The battery may include a non-rechargeable primary battery, and/or a rechargeable battery or fuel cell such as a hydrogen fuel cell, without limitation thereto. The power module 150 may include a power management integrated circuit (PMIC). The PMIC may supply optimized power to each of the above-described modules and modules to be described later. The power module 150 may include a wireless power transmission/reception member electrically connected to a battery. The wireless power transmission/reception member may include a plurality of antenna radiators in a form of a coil.

The electronic device 101 may further include an internal module 190 and an external module 170. The internal module 190 may include the sensor module 191, the antenna module 192, and the sound output module 193. The external module 170 may include the camera module 171, a light module 172, and the communications module 173.

The sensor module 191 may sense active or passive input by or from a user's body, or input by the pen among the first input module 131, and may generate an electrical signal or a data value corresponding to the input. The sensor module 191 may include at least one or more of the fingerprint sensor 191-1 the input sensor 191-2 and the digitizer 191-3

The fingerprint sensor 191-1 may generate a data value corresponding to a user's fingerprint, toeprint, or the like. The fingerprint sensor 191-1 may include either an optical type or a capacitive type of fingerprint sensor.

The input sensor 191-2 may generate a data value corresponding to coordinate information of input by the user's body, or input by the pen. For example, the input sensor 191-2 generates an amount of change in capacitance by the input as a data value. The input sensor 191-2 may sense input by the passive pen, or may transmit/receive data with the active pen.

The input sensor 191-2 may measure a biosignal such as blood pressure, water content, or body fat. For example, when the user touches a part of the body to the sensor layer or the sensing panel and does not move for a certain period of time, based on a change in an electric field by the part of the body, the input sensor 191-2 may sense a biosignal and output desired information to the display module 140.

The digitizer 191-3 may generate a data value corresponding to coordinate information of a pen input. For example, the digitizer 191-3 generates an electromagnetic change amount by the input as a data value. The digitizer 191-3 may sense input by the passive pen, or may transmit/receive data with the active pen.

At least one of the fingerprint sensor 191-1, the input sensor 191-2 or the digitizer 191-3 may be implemented as a sensor layer disposed on the display panel 141 through a continuous process. The fingerprint sensor 191-1 the input sensor 191-2 and/or the digitizer 191-3 may be disposed at an upper side of the display panel 141, and one of the fingerprint sensor 191-1 the input sensor 191-2 and/or the digitizer 191-3 for example, the digitizer 191-3 may be disposed at a lower side of the display panel 141.

At least two or more of the fingerprint sensor 191-1 the input sensor 191-2 and the digitizer 191-3 may be provided to be integrated into one sensing panel through substantially the same process. When integrated into one sensing panel, the sensing panel may be disposed between the display panel 141 and a window disposed at an upper side of the display panel 141. According to an embodiment, the sensing panel may be disposed on the window, and the position of the sensing panel is not particularly limited.

At least one of the fingerprint sensor 191-1 the input sensor 191-2 and the digitizer 191-3 may be embedded in the display panel 141. That is, at least one of the fingerprint sensor 191-1 the input sensor 191-2 and the digitizer 191-3 may be simultaneously formed through the process of forming elements (e.g., a light-emitting element, a transistor, and the like) included in the display panel 141.

In addition, the sensor module 191 may generate an electrical or electronic signal or a data value corresponding to an internal state or an external state of the electronic device 101. The sensor module 191 may further include, for example, a gesture sensor, a gyro sensor, a barometric pressure sensor, a magnetic sensor, an acceleration sensor, a grip sensor, a proximity sensor, a color sensor, an infrared (IR) sensor, an ultraviolet (UV) sensor, a radiation sensor, a biometric sensor, a temperature sensor, a humidity sensor, and/or an illuminance sensor.

The antenna module 192 may include one or more antennas for transmitting or receiving a signal or power to or from the outside. According to an embodiment, the communications module 173 may transmit a signal to an external electronic device or receive a signal from an external electronic device through an antenna suitable for a communications method. An antenna pattern of the antenna module 192 may be integrated into one component (e.g., the display panel 141) of the display module 140 or the input sensor 191-2

The sound output module 193 is a device for outputting a sound signal to the outside of the electronic device 101, and may include, for example, a speaker used for general purposes such as multimedia playback or recording playback, and a receiver used exclusively for receiving calls. According to an embodiment, the receiver may be provided integrally with or separately from the speaker. A sound output pattern of the sound output module 193 may be integrated into the display module 140.

The camera module 171 may capture still images and/or moving images. According to an embodiment, the camera module 171 may include one or more lenses, image sensors, or image signal processors. The camera module 171 may further include an infrared camera capable of measuring the presence or absence of the user, the position of the user, and the gaze of the user.

The light module 172 may provide light. The light module 172 may include a light-emitting diode or a xenon lamp. The light module 172 may operate in conjunction with the camera module 171 or may operate independently.

The communications module 173 may support establishment of a wired or wireless communications channel between the electronic device 101 and the external electronic device 102, and communications through the established communications channel. The communications module 173 may include one or both of a wireless communications module, such as a cellular communications module, a short range communications module, or a global navigation satellite system (GNSS) communications module and a wired communications module such as a local area network (LAN) communications module or a power line communications module. The communications module 173 may communicate with the external electronic device 102 through a short range communications network such as Bluetooth®, Wi-Fi$^{T}$M Direct, or infrared data association (IrDA); or a long range communications network such as a cellular network, the Internet, or a computer network such as a local area network (LAN) or a wide area network (WAN). The various types of the communications modules 173 described above may be implemented as a single chip or may be implemented as separate chips.

The input module 130, the sensor module 191, the camera module 171, and the like may be used to control an operation of the display module 140 in conjunction with the processor 110.

The processor 110 may output an instruction or data to the display module 140, the sound output module 193, the camera module 171, or the light module 172 based on input data received from the input module 130. For example, the processor 110 may generate image data in response to input data applied through a mouse or an active pen to output it to the display module 140, or may generate instruction data in response to the input data to output it to the camera module 171 and/or to the light module 172. When input data is not received from the input module 130 for a certain period of time, the processor 110 may reduce power consumed by the electronic device 101 by changing an operation mode of the electronic device 101 to a low power mode or a sleep mode.

The processor 110 may output an instruction or data to the display module 140, the sound output module 193, the camera module 171, and/or the light module 172 based on sensing data received from the sensor module 191. For example, the processor 110 may compare authentication data applied by the fingerprint sensor 191-1 with authentication data stored in the memory 180 and then execute an application according to the compared result. The processor 110 may execute an instruction based on sensed data that is sensed by the input sensor 191-2 and/or the digitizer 191-3, or may output corresponding image data to the display module 140. When the sensor module 191 includes a temperature sensor, such as an external temperature sensor and/or an internal temperature sensor, the processor 110 may receive temperature data for a measured temperature from the sensor module 191, and may further perform luminance correction on image data based on the temperature data.

The processor 110 may receive measurement data regarding the presence of a user, a user's position, a user's gaze, and the like, from the camera module 171. The processor 110 may further perform luminance correction and the like on image data based on the measurement data. For example, the processor 110 that determines the presence of a user through an input from the camera module 171, may output image data with luminance corrected through the data conversion circuit 112-2 and/or the gamma correction circuit 112-3 to the display module 140.

Some of the above constituent elements may be connected to each other through a communications method between peripheral devices, such as for example, a bus, a general purpose input/output (GPIO), a serial peripheral interface (SPI), a mobile industry processor interface (MIPI), an ultra-path interconnect (UPI) or the like link to exchange a signal (e.g., an instruction or data) between each other. The processor 110 may communicate with the display module 140 through a mutually agreed interface, for example, such as one of the above-described communications methods, but is not limited to the above-described communications methods.

The electronic device 101, according to various embodiments disclosed in the present specification, may be a device of various types. The electronic device 101 may include, for example, at least one of a portable communications device (e.g., a smartphone), a computer device, a portable multimedia device, a portable medical device, a camera, a wearable device, a home appliance, or the like. The electronic device 101 according to an embodiment of the present disclosure is not limited to the above-described devices.

While this disclosure has been described in connection with what are presently considered to be practical embodiments, it is to be understood that the disclosure is not limited to the disclosed embodiments, but, on the contrary, is intended to cover various modifications and equivalent arrangements included within the spirit and scope of the appended claims. Therefore, those of ordinary skill in the pertinent art will understand that various modifications and other equivalent embodiments of the present disclosure are possible. Consequently, the true technical protective scope of the present disclosure shall be determined based on the technical scope and spirit of the appended claims.

What is claimed is:

1. A display device comprising:

pixels that receive data voltages corresponding to output grayscales;

a sensing circuit that senses electrical states of the pixels to provide sensing information; and a grayscale converter that generates the output grayscales with respect to the pixels based on input grayscales and the sensing information, wherein the grayscale converter predicts a temperature of at least one of the pixels based on the sensing information, calculates a current control amount for the at least one of the pixels based on the predicted temperature and the input grayscales, and calculates the output grayscales for the at least one of the pixels based on the current control amount and the input grayscales.

2. The display device of claim 1, wherein:

the sensing information for the at least one of the pixels comprises at least one of a mobility of a respective driving transistor, a threshold voltage of the respective driving transistor, or a threshold voltage of a respective light-emitting diode.

3. The display device of claim 2, wherein:

the grayscale converter includes a temperature predictor that predicts a temperature of the at least one of the pixels to increase or decrease as the corresponding mobility increases or decreases, respectively.

4. The display device of claim 1, wherein:

the grayscale converter includes a current control amount calculator that calculates the current control amount of the at least one of the pixels to increase or decrease as the predicted temperature and the input grayscales increase or decrease, respectively.

5. The display device of claim 4, wherein:

the grayscale converter further includes a grayscale calculator that calculates a difference between the input grayscales and the output grayscales to increase or decrease as an absolute value of the current control amount increases or decreases, respectively.

6. The display device of claim 5, wherein:

the grayscale calculator calculates the output grayscales to decrease versus the input grayscales as the absolute value of the current control amount increases when the current control amount has a positive value, and the grayscale calculator calculates the output grayscales to increase versus the input grayscales as the absolute value of the current control increases when the current control amount has a negative value.

7. The display device of claim 1, wherein:

the grayscale converter includes a current control amount calculator that calculates the current control amount in units of blocks partitioning the pixels, and the at least one of the pixels comprises a block.

8. The display device of claim 7, wherein:

the current control amount calculator includes a current change ratio calculator that calculates a current change ratio for each of the blocks to increase as the predicted temperature increases.

9. The display device of claim 8, wherein:

the current control amount calculator further includes a load ratio calculator that calculates a load ratio for each of the blocks as a ratio of the input grayscales of each respective block to the input grayscales of substantially all of the pixels.

10. The display device of claim 9, wherein:

the current control amount calculator further includes a total current control amount calculator that calculates the current control amount for each of the blocks by summing values obtained by multiplying the current change ratio and the load ratio.

11. A driving method for a display device, comprising:

sensing electrical states of pixels to provide sensing information;

generating output grayscales with respect to the pixels based on input grayscales and the sensing information; and supplying data voltages to the pixels corresponding to the output grayscales, wherein in the generating of the output grayscales, a temperature of the pixels is predicted based on the sensing information, a current control amount is calculated based on the predicted temperature and the input grayscales, and the output grayscales are calculated based on the current control amount and the input grayscales.

12. The driving method of claim 11, wherein:

the sensing information comprises a mobility of a driving transistor included in each of the pixels, respectively.

13. The driving method of claim 12, wherein:

in the generating of the output grayscales, a temperature of the corresponding pixels is predicted to increase or decrease as the mobility increases or decreases, respectively.

14. The driving method of claim 13, wherein:

in the generating of the output grayscales, the current control amount is calculated to increase or decrease as the predicted temperature and the input grayscales increase or decrease, respectively.

15. The driving method of claim 11, wherein:

in the generating of the output grayscales, a difference between the input grayscales and the output grayscales is calculated to increase or decrease as an absolute value of the current control amount increases or decreases, respectively.

16. The driving method of claim 15, wherein:

the output grayscales are calculated to decrease versus the input grayscales as the absolute value of the current control amount increases when the current control amount has a positive value, and the output grayscales are calculated to increase versus the input grayscales as the absolute value of the current control amount increases when the current control amount has a negative value.

17. The driving method of claim 11, wherein:

in the generating of the output grayscales, the current control amount is calculated in units of blocks partitioning the pixels.

18. The driving method of claim 17, wherein:

for each of the blocks, a current change ratio is calculated to increase as the predicted temperature increases.

19. The driving method of claim 17, wherein:

for each of the blocks, a load ratio is calculated that is a ratio of the input grayscales of each block to the input grayscales of substantially all of the pixels.

20. The driving method of claim 17, wherein, for each of the blocks:

a current change ratio is calculated to increase as the predicted temperature increases;

a load ratio is calculated that is a ratio of the input grayscales of each block to the input grayscales of substantially all of the pixels;

the current control amount is calculated by summing values obtained by multiplying the current change ratio and the load ratio.

* * * * *